US009900624B2

(12) United States Patent
Lai et al.

(10) Patent No.: US 9,900,624 B2
(45) Date of Patent: Feb. 20, 2018

(54) METHODS AND APPARATUS OF DECODING PROCESS FOR PALETTE SYNTAX

(71) Applicant: MEDIATEK INC., Hsin-Chu (TW)

(72) Inventors: Wang-Lin Lai, San Jose, CA (US); Jungsun Kim, San Jose, CA (US); Tzu-Der Chuang, Zhubei (TW); Jing Ye, San Jose, CA (US); Shan Liu, San Jose, CA (US)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/542,739

(22) PCT Filed: Feb. 5, 2016

(86) PCT No.: PCT/CN2016/073647

§ 371 (c)(1),
(2) Date: Jul. 11, 2017

(87) PCT Pub. No.: WO2016/124158

PCT Pub. Date: Aug. 11, 2016

(65) Prior Publication Data

US 2018/0014034 A1 Jan. 11, 2018

Related U.S. Application Data

(60) Provisional application No. 62/170,272, filed on Jun. 3, 2015, provisional application No. 62/134,129, filed
(Continued)

(51) Int. Cl.
*H04N 19/44* (2014.01)
*H04N 19/86* (2014.01)
(Continued)

(52) U.S. Cl.
CPC ........... *H04N 19/86* (2014.11); *H04N 19/176* (2014.11); *H04N 19/186* (2014.11); *H04N 19/44* (2014.11); *H04N 19/593* (2014.11); *H04N 19/70* (2014.11)

(58) Field of Classification Search
CPC .............. G06T 9/00–9/40; H04N 19/00–19/99
See application file for complete search history.

(56) References Cited

U.S. PATENT DOCUMENTS

2014/0301474 A1 10/2014 Guo et al.
2015/0016501 A1* 1/2015 Guo .......................... G06T 9/00 375/240.02

(Continued)

FOREIGN PATENT DOCUMENTS

CN 104244007 A 12/2014
CN 104301737 A 1/2015

OTHER PUBLICATIONS

International Search Report dated May 11, 2016, issued in application No. PCT/CN2016/073647.

*Primary Examiner* — Sean Motsinger
(74) *Attorney, Agent, or Firm* — McClure, Qualey & Rodack, LLP

(57) ABSTRACT

Methods and apparatus for image or video decoding in a video decoding system are disclosed. Input data associated with a current block coded with palette mode is received to parse a palette predictor run. A position of reused colors in a palette predictor table is computed according to the palette predictor run. A size of the palette predictor table is determined and compared with the position computed according to the palette predictor run to obtain a comparison result. The decoder applies palette decoding to the current block according to the comparison result. If the comparison result indicates the position computed according to the palette predictor run is not within the palette predictor table, the position is changed to a new position to indicate a corresponding
(Continued)

reused color for the current block or a decoding process of palette predictor reuse flags is terminated.

16 Claims, 11 Drawing Sheets

Related U.S. Application Data on Mar. 17, 2015, provisional application No. 62/112,198, filed on Feb. 5, 2015.

(51) Int. Cl.

| | |
|---|---|
| ***H04N 19/186*** | (2014.01) |
| ***H04N 19/176*** | (2014.01) |
| *H04N 19/70* | (2014.01) |
| *H04N 19/593* | (2014.01) |

(56) References Cited

U.S. PATENT DOCUMENTS

| | | | | |
|---|---|---|---|---|
| 2015/0186100 | A1* | 7/2015 | Tsai | G06F 3/1454 375/240.12 |
| 2016/0234498 | A1* | 8/2016 | Misra | H04N 19/46 |
| 2017/0019677 | A1* | 1/2017 | Sun | H04N 19/593 |
| 2017/0105002 | A1* | 4/2017 | Chuang | H04N 19/157 |
| 2017/0111651 | A1* | 4/2017 | Chuang | H04N 19/593 |
| 2017/0127077 | A1* | 5/2017 | Chuang | H04N 19/46 |
| 2017/0134725 | A1* | 5/2017 | Chuang | H04N 19/105 |
| 2017/0238001 | A1* | 8/2017 | Li | H04N 19/436 375/240.12 |
| 2017/0257630 | A1* | 9/2017 | Lai | H04N 1/644 |
| 2017/0264909 | A1* | 9/2017 | Koyama | H04N 19/48 |

* cited by examiner

| | |
|---|---|
| palettePredictionFinished = 0 | |
| NumPredictedPaletteEntries = 0 | |
| for ( i = 0; i < PredictorPaletteSize && !palettePredictionFinished && NumPredictedPaletteEntries < palette_max_size; i++ ) { | |
| **palette_predictor_run** | ue (v) |
| if ( palette_predictor_run ! = 1 ) { | |
| if ( palette_predictor_run > 1 ) | |
| i + = palette_predictor_run - 1 | |
| PalettePredictorEntryReuseFlag [ i ] = 1 | |
| NumPredictedPaletteEntries ++ | |
| } else | |
| palettePredictionFinish = 1 | |
| } | |

Fig. 2

| | |
|---|---|
| palettePredictionFinished = 0 | |
| NumPredictedPaletteEntries = 0 | |
| for ( i = 0; i < PredictorPaletteSize && !palettePredictionFinished && NumPredictedPaletteEntries < palette_max_size; i++ ) { | |
| **palette_predictor_run** | ue (v) |
| if ( palette_predictor_run ! = 1 ) { | |
| if ( palette_predictor_run > 1 ) | |
| i + = palette_predictor_run - 1 | |
| if ( i > = PredictorPaletteSize ) | |
| palettePredictionFinish = 1 | |
| else { | |
| PalettePredictorEntryReuseFlag [ i ] = 1 | |
| NumPredictedPaletteEntries ++ | |
| } | |
| } else | |
| palettePredictionFinish = 1 | |
| } | |

32 (bracket beside rows "if ( i > = PredictorPaletteSize )" and "palettePredictionFinish = 1")

Fig. 3

| | | |
|---|---|---|
| | palettePredictionFinished = 0 | |
| | NumPredictedPaletteEntries = 0 | |
| | for ( i = 0; i < PredictorPaletteSize && !palettePredictionFinished && NumPredictedPaletteEntries < palette_max_size; i++ ) { | |
| | **palette_predictor_run** | ue (v) |
| | if ( palette_predictor_run ! = 1 ) { | |
| | if ( palette_predictor_run > 1 ) | |
| 42 | i + = palette_predictor_run - 1 | |
| 42 | i = Min ( i, PredictorPaletteSize - 1 ) | |
| | PalettePredictorEntryReuseFlag [ i ] = 1 | |
| | NumPredictedPaletteEntries ++ | |
| | } else | |
| | palettePredictionFinish = 1 | |
| | } | |

Fig. 4

| | |
|---|---|
| palettePredictionFinished = 0 | |
| NumPredictedPaletteEntries = 0 | |
| for ( i = 0; i < PredictorPaletteSize && !palettePredictionFinished && NumPredictedPaletteEntries < palette_max_size; i++ ) { | |
| **palette_predictor_run** | ue (v) |
| if ( palette_predictor_run ! = 1 ) { | |
| if ( palette_predictor_run > 1 ) | |
| { | |
| if ( i + palette_predictor_run - 1 > PredictorPaletteSize - 1) | |
| i + = 1 | |
| else | |
| i + = palette_predictor_run - 1 | |
| } | |
| PalettePredictorEntryReuseFlag [ i ] = 1 | |
| NumPredictedPaletteEntries ++ | |
| } else | |
| palettePredictionFinish = 1 | |
| } | |

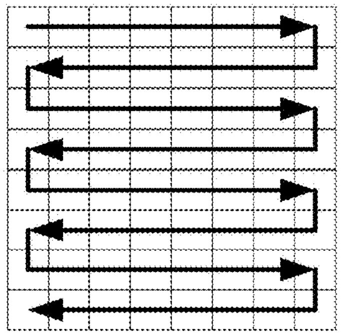
Fig. 8A
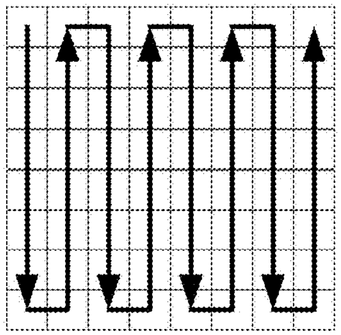
Fig. 8B
| | | | |
|---|---|---|---|
| 0 | 1 | 2 | 3 |
| 4 | 5 | 6 | 7 |
| 8 | 9 | 10 | 11 |
| 12 | 13 | 14 | 15 |
Fig. 9A
| | | | |
|---|---|---|---|
| 15 | 14 | 13 | 12 |
| 11 | 10 | 9 | 8 |
| 7 | 6 | 5 | 4 |
| 3 | 2 | 1 | 0 |
Fig. 9B

| | | | |
|---|---|---|---|
| Horizontal_Raster | 8x8 | 16x16 | 32x32 |
| Vertical_Raster | 8x8 | 16x16 | 32x32 |
| Rotated_Horizontal_Raster | 8x8 | | |
| Rotated_Vertical_Raster | 8x8 | | |

Fig. 13

| | | | |
|---|---|---|---|
| Horizontal_Raster | 8x8 | 16x16 | 32x32 |
| Vertical_Raster | 8x8 | 16x16 | 32x32 |
| Rotated_Horizontal_Raster | 8x8 | | |

Fig. 14

METHODS AND APPARATUS OF DECODING PROCESS FOR PALETTE SYNTAX

CROSS REFERENCE TO RELATED APPLICATIONS

The present invention claims priority to U.S. Provisional Patent Application, Ser. No. 62/112,198, filed on Feb. 5, 2015, entitled "Methods and apparatus for palette index scan and coding", and U.S. Provisional Patent Application Ser. No. 62/134,129, filed on Mar. 17, 2015, entitled "Methods and apparatus for palette index scan and coding with rotation", and U.S. Provisional Patent Application Ser. No. 62/170,272, filed on Jun. 3, 2015, entitled "Methods and apparatus of palette syntax and decoding process". The U.S. Provisional Patent Applications are hereby incorporated by reference in their entireties.

FIELD OF THE INVENTION

The present invention relates to palette coding techniques in image and video coding. In particular, the present invention relates to decoding palette syntax in palette mode.

BACKGROUND AND RELATED ART

In the newly developed coding standard High Efficiency Video Coding (HEVC) system, the fixed-size macroblock (MB) of H.264/AVC is replaced by a flexible block, named coding unit (CU). Pixels in the CU share coding parameters to improve coding efficiency. Partition of a picture begins with a largest CU (LCU), also referred as coded tree unit (CTU), and each LCU is adaptively split into leaf CUs. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

Along with the HEVC standard development, Screen Content Coding Extension (SCC) of HEVC standard is being developed under JCTVC. Due to specific characteristics of screen contents, coding tools have been developed and demonstrate significant gains in coding efficiency. Among them, the palette coding (a.k.a. major color based coding) techniques represent a block of pixels using indices pointing to a palette of major colors, and encode the major colors, together with the coded palette index map representing the block. While the total number of possible color combinations is huge, the number of colors in a local area of a picture is usually very limited for typical screen contents. Most objects in screen contents have relatively uniform colors and are separated by sharp edges. Therefore, the palette coding techniques used in palette mode become very effective for coding screen contents including web page browsing, Word document editing, PowerPoint files, or screen captures with mixtures of multiple applications.

The coding process in palette mode consists of two steps: the palette table coding process and the palette index map coding process. The palette table coding comprises locating a number of major colors from a current block and mapping the major colors to palette indices. Other colors in the current block are defined as escape colors, which are coded not using the palette index but the quantization of the pixel values. The palette table containing the palette indices conducts predictive coding by referring to palette colors from previous palette-coded blocks. Predictive coding utilizes a palette predictor table and palette stuffing to reconstruct the palette table.

The palette predictor table is formed to keep track of the major colors used by the palette coded blocks. When a current block is selected to be coded in palette mode, colors in the palette predictor table predict the palette of the current block by signaling a stream of palette reuse flags. FIG. 1 illustrates the palette reconstructing process specified in SCC Draft Text 3. A palette of the current block 12 is predicted from a palette predictor table 14 according to a palette reuse flag array 16. The palette reuse flag array 16 indicates the positions of entries in the palette predictor table 14 that are reused by the current block palette 12. In FIG. 1, palette reuse flags in the palette reuse flag array 16 are {1 0 1 1 0 0 0 1 0 0 0 0 1 0 0 0 0 0 0 0 0 0}, indicating the first, third, fourth, eighth, and thirteenth entries in the palette predictor table 14 are reused colors 122 for the current block palette 12. The palette reuse flags are coded by run-length coding, so the number of zeros, which is the run value, between two ones are coded by a syntax element palette_predictor_run. In a decoder, a palette reuse flag is set to 1 when a corresponding palette_predictor_run is parsed and decoded, and the color in the palette predictor table 14 indicated by the palette reuse flag is included in the palette of the current block 12. After all the palette_predictor_run are decoded, all the corresponding palette reuse flags are set and all the reused colors 122 for the current block palette 12 are found. Beside the reused colors 122 derived from the palette predictor table 14, the current block palette 12 may also contain new colors 124. The new colors 124 are signaled directly in the bitstream. A syntax element num_signalled_palette_entries is signaled to indicate the number of new colors 124 in the current block palette 12.

The palette index map coding process encodes information including palette index scanning orientation and the palette index map. The palette index scanning orientation is coded using a transpose flag palette_transpose_flag. The palette index map refers to the block expressed by replacing the pixel values of the current block with palette indices. Several palette run types include COPY_INDEX mode, COPY_ABOVE mode, and ESCAPE mode. In the COPY_INDEX mode, run-length coding is conducted for the palette index value, and the palette run type, palette index, and run-length are coded. In the COPY_ABOVE mode, which copies the palette index of the above row, the palette run type and run-length are coded. In the ESCAPE mode, which uses the pixel value as it is, the palette run type and the quantized pixel value are coded.

Pixels in the current block are coded by the palette index map in a predetermined scanning order according to the transpose flag. For each group of one or more pixels, the palette run type is determined to indicate which mode is being used. When a group of pixels is coded in the COPY_INDEX mode, a palette index is first decoded followed by palette run representing the run-length. The run-length palette run indicates a total number of samples coded using the COPY_INDEX mode. When a group of pixels is coded in the COPY_ABOVE mode, a run-length copy_run is decoded to indicate that for the following pixels including the current one, the palette index is the same as the corresponding palette index in the row above.

In the development of SCC standard, a modification of the palette index map coding process includes inserting a last run flag to signal whether the current run is the last run in the palette index map for the processed block. This signaling method is called Run-to-the-end signaling and is particularly useful when the last run is long. When the last run flag is 1, the remainder of the processed block uses the same mode, either the COPY_INDEX mode or the COPY_ABOVE mode, so signaling the actual number of elements included in the run is no longer needed.

Another modification of the palette index map coding process includes grouping palette indices at front and not-signaling-the-last-run. All the palette indices in a current block are grouped together and signaled before syntax elements for the palette run type and the palette run length. The not-signaling-the-last-run method signals the number of palette indices and a flag used to indicate the last palette run type is the COPY_ABOVE mode or the COPY_INDEX mode. The decoder derives the last run from the number of palette indices and the last palette run type flag. The run length of the last run can be derived to reach the end of the current block, so there is no need to signal the last run. Similar to the above Run-to-the-end signaling method, this not-signaling-the-last-run signaling modification is particularly efficient when coding a long last run.

When signaling all the palette indices before signaling other syntax elements, these palette indices have to be stored for reconstructing the palette index map. The palette indices are stored in a temporary buffer at least until the palette run type and palette run length are parsed. An additional temporary buffer, in addition to the buffer for storing the palette index map, is required, unless reusing the palette index map buffer and inserting the palette index data into the end of the palette index map buffer. The order of palette index map syntax signaling in HEVC SCC test model SCM-4.0 becomes: Number of palette indices→Group of all palette indices→Last palette run type flag→{palette run type, run length} interleaved pairs→Group of all Escape values.

BRIEF SUMMARY OF THE INVENTION

Methods and apparatus for image or video decoding in a decoding system prevent possible crashes when decoding blocks coded in palette mode. The decoding system receives input data associated with a current block coded with palette mode and the decoding system parses a palette predictor run. A position of reused colors in a palette predictor table is computed according to the palette predictor run. More specifically, the position is computed by decoding the palette predictor run and adding the decoded palette predictor run to a previous position. The decoding system determines a size of the palette predictor table or a size of a palette reuse flag array and compares the size with the position computed according to the palette predictor run to obtain a comparison result. The decoding system applies palette decoding to the current block according to the comparison result. In the case when the comparison result indicates the position computed according to the palette predictor run is within the palette predictor table, the decoding system sets a palette reuse flag in the palette reuse flag array corresponding to the position computed according to the palette predictor run to indicate a reused color in the palette predictor table is selected for a palette of the current block. If the comparison result indicates the position computed according to the palette predictor run is not within the palette predictor table, the position is changed to a new position to indicate a corresponding reused color for the current block or a decoding process of palette predictor reuse flags is terminated.

In some embodiments, by terminating the decoding process of the palette predictor reuse flags, the decoding system stops parsing another palette predictor run and stops adding other reused colors from the palette predictor table to the palette of the current block.

In an embodiment, by changing the position to a new position, the decoding system sets a palette reuse flag corresponding to a last position in the palette predictor table to indicate a reused color in the last entry of the palette predictor table is selected for the palette of the current block. In another embodiment, by changing the position to a new position, the decoding system sets a palette reuse flag corresponding to an immediate next position in the palette predictor table to indicate a reused color immediate next to a previous selected reused color in the palette predictor table is selected for the palette of the current block. In yet another embodiment, by changing the position to a new position, the decoding system sets a palette reuse flag corresponding to a predefined position in the palette predictor table to indicate a reused color in a predefined entry of the palette predictor table is selected for the palette of the current block.

Other aspects and features of the invention will become apparent to those with ordinary skill in the art upon review of the following descriptions of specific embodiments.

BRIEF DESCRIPTION OF THE DRAWINGS

FIG. 2 illustrates a decoding process for palette predictor run and palette reuse flags described in SCC Draft Text 3.

FIG. 3 shows an exemplary decoding process for palette predictor run and palette reuse flags in accordance with the first embodiment of the present invention.

FIG. 4 shows an exemplary decoding process for palette predictor run and palette reuse flags in accordance with the second embodiment of the present invention.

FIG. 5 shows an exemplary decoding process for palette predictor run and palette reuse flags in accordance with the third embodiment of the present invention.

FIGS. 8A and 8B illustrate horizontal traverse scan and vertical traverse scan used for scanning the palette index map.

FIGS. 9A and 9B illustrate numbers in a 4×4 block indicating a scanning order of exemplary horizontal raster scans before and after the 180-degree rotation.

FIG. 13 shows a table listing the raster scanning patterns for block sizes 8×8, 16×16, and 32×32 when the rotation size limit is 8 and rotation is applied to both horizontal and vertical raster scans.

FIG. 14 shows a table showing the raster scanning patterns for block size 8×8, 16×16, and 32×32 if the rotation size limit is 8 and rotation is only applied to the horizontal raster scan.

DETAILED DESCRIPTION OF THE INVENTION

Figure 1:
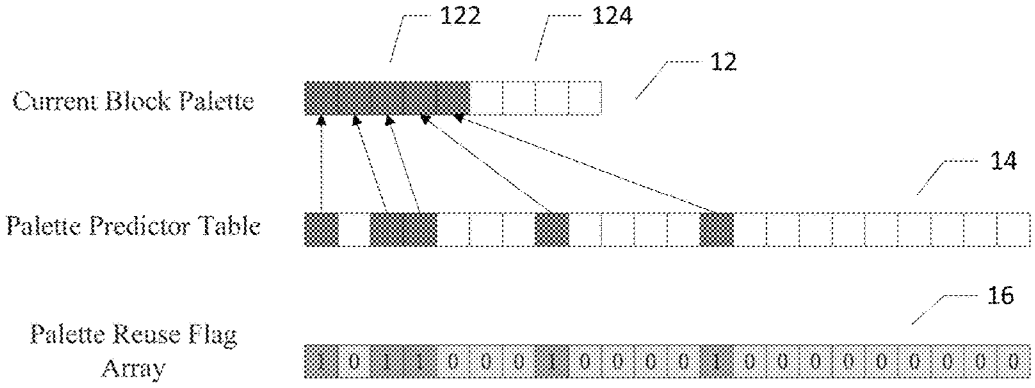
FIG. 1 illustrates an exemplary palette reconstruction process by predicting palette entries from a palette predictor table.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. In the following discussion and in the claims, the term "including" and "comprising" are used in an open-ended fashion, and thus should be interpreted to mean "including, but not limited to . . . ".

The decoding process for palette predictor run and palette reuse flags in SCC Draft Text 3 is illustrated in FIG. 2. A syntax element palettePredictionFinished indicates whether a decoding process of palette predictor reuse flags for a current block coded in palette mode is terminated, and a syntax element NumPredictedPaletteEntries indicates the number of reused colors in a palette predictor table selected for a palette of a current block. The counter i is used to point to a position in the palette predictor table and a syntax element PredictorPaletteSize indicates a size of the palette predictor table used for the current block. A syntax element palette_max_size, signaled in Sequence Parameter Set (SPS), restricts the maximum palette size for the current block, for example palette_max_size is set to 31 (plus one for escape index) in the reference software. The current block in this embodiment is a leaf coding unit (CU) coded in palette mode. When a palette predictor run (palette_predictor_run) coded using Exponential Golomb order 0 (EG-0) is parsed and decoded, a corresponding position i is computed by adding the decoded palette predictor run with a previous position. The corresponding position i sets a reuse flag to 1, such that a corresponding entry in the palette predictor table is selected to be added to the palette of the current block.

It is possible for encoders to generate a palette predictor run in a video bitstream which results in a decoder computes an invalid value of i that is not within the palette predictor table. For example, the size of the palette predictor table used for the current block is 17, the current position of i is 14, and the parsed and decoded palette predictor run is 10, the position of i indicated by the decoded palette predictor run becomes 23 as i+=palette_predictor_run−1 (14+10−1=23), which is beyond the size of the palette predictor table 17. In this case, decoder behavior could become unspecified, ambiguous, or the decoder could even crash when accessing outside the palette predictor table. The following embodiments demonstrate some methods for the decoder to prevent accessing beyond the array size of the palette predictor table by handling the palette predictor run and setting the reuse flag array at the decoder.

A decoder of some following embodiments receives input data associated with a current block coded using palette mode, a palette predictor run is parsed and decoded to compute a position of reused colors in a palette predictor table. A size of the palette predictor table is determined and compared to the position computed according to the palette predictor run to obtain a comparison result. The decoder applies palette decoding to the current block according to the comparison result.

First Embodiment

In the first embodiment, a decoder compares a position computed by a parsed and decoded palette predictor run against a size of a palette predictor table or a size of a palette reuse flag array. The position is indicated by an updated counter i+palette_predictor_run−1, and the last position of the palette predictor table is indicated by a size PredictorPaletteSize−1, so the decoder compares the two values (i+palette_predictor_run−1, PredictorPaletteSize−1); or equivalently, the decoder compares between (i+palette_predictor_run, PredictorPaletteSize). FIG. 3 shows an exemplary decoding process for palette predictor run and reuse flags in accordance with the first embodiment of the present invention. If the updated counter i+palette_predictor_run−1 is larger than the size PredictorPaletteSize−1, the loop for the decoding process for palette predictor reuse flags is terminated by setting the syntax element palettePredictionFinished to 1 as shown in segment 32 of FIG. 3. The termination of decoding process for palette predictor reuse flags comprises stop parsing another palette predictor run and stop adding other reused colors from the palette predictor table to the palette of the current block. After terminating the loop, no further access to the palette reuse flag array, PalettePredictorENtryReuseFlag[ ], and no increase to the number of reused colors selected for the palette of the current block, NumPredictedPaletteEntries. In other words, the decoder of the first embodiment adds a conditional check on the counter i, which terminates the loop for decoding palette predictor reuse flags if an invalid palette predictor run is received.

Second Embodiment

The second embodiment also checks the position computed by the decoded palette predictor run against the size of the palette predictor table by computing the updated counter i (i+palette_predictor_run−1) then capping the counter i to the value PredictorPaletteSize−1 as shown in segment 42 of FIG. 4. FIG. 4 shows an exemplary decoding process for palette predictor run and reuse flags in accordance with the second embodiment. In segment 42, the counter i is set to a minimum value of the updated counter computed by the palette predictor run and the size of the palette predictor table minus 1. If the updated counter i exceeds the size of the palette predictor table minus 1 (PredictorPaletteSize−1), the counter i will be capped to the size of the palette predictor table minus 1 (PredictorPaletteSize−1), otherwise the counter i will be the updated counter computed by the palette predictor run. By setting the counter i to PredictorPaletteSize−1, the counter points to the last position of the palette predictor table by setting the last reuse flag of the palette reuse flag array to 1. The number of reused colors selected for the palette of the current block NumPredictedPaletteEntries is increased by 1. A corresponding position of the last reuse flag is the last position in the palette predictor table, thus the last entry of the palette predictor table is included in the palette for decoding the current block. In other words, the position computed by the palette predictor run is changed from an invalid position to the last position of the palette prediction table if the computed position is greater than the palette prediction table size. Once the counter i is set to PredictorPaletteSize−1 due to the comparison operation in segment 42 of FIG. 4, indicating the position is set to the last position in the palette predictor table, the for-loop will terminate as i++ produces a value equal to PredictorPaletteSize, violating the for-loop condition.

Third Embodiment

In this embodiment, the position computed by the decoded palette predictor run is checked against the size of the palette predictor table or the last position of the palette reuse flag array. If the position computed by the decoded palette predictor run is not within the size of the palette predictor table or beyond the last position of the palette reuse flag array, the third embodiment changes the position to an immediate next position i+1 in the palette predictor table. FIG. 5 shows an exemplary decoding process for palette predictor run and reuse flags in accordance with the third embodiment. Segment 52 in FIG. 5 illustrates the counter i is increased by 1 if the computed position (i+palette_predictor_run−1) is greater than the palette predictor size minus 1 (PredictorPaletteSize−1). The new position is the immediate next position of a previous position. The palette reuse flag corresponds to the immediate next position is set to 1 to indicate a reused color immediate next to a previous selected reused color in the palette predictor table is selected for the palette of the current block. In a variation of the third embodiment, the position is changed to a predefined position in the palette predictor table or the $N^{th}$ position subsequent to the previous position i+N, where N is an integer. The palette reuse flag corresponds to the new position is set to 1 and a reused color in a corresponding entry of the palette predictor table is selected for the palette of the current block.

Fourth Embodiment

In this embodiment, the coding of palette predictor run is changed from Exponential Golomb order 0, EG-0 code, to truncated EG-0 code. In truncated EG-0 coding, the counter i is always smaller than the size of the palette predictor table when a maximum value for the truncated EG-0 code is set to be PredictorPaletteSize−1 for each i.

Figure 6:
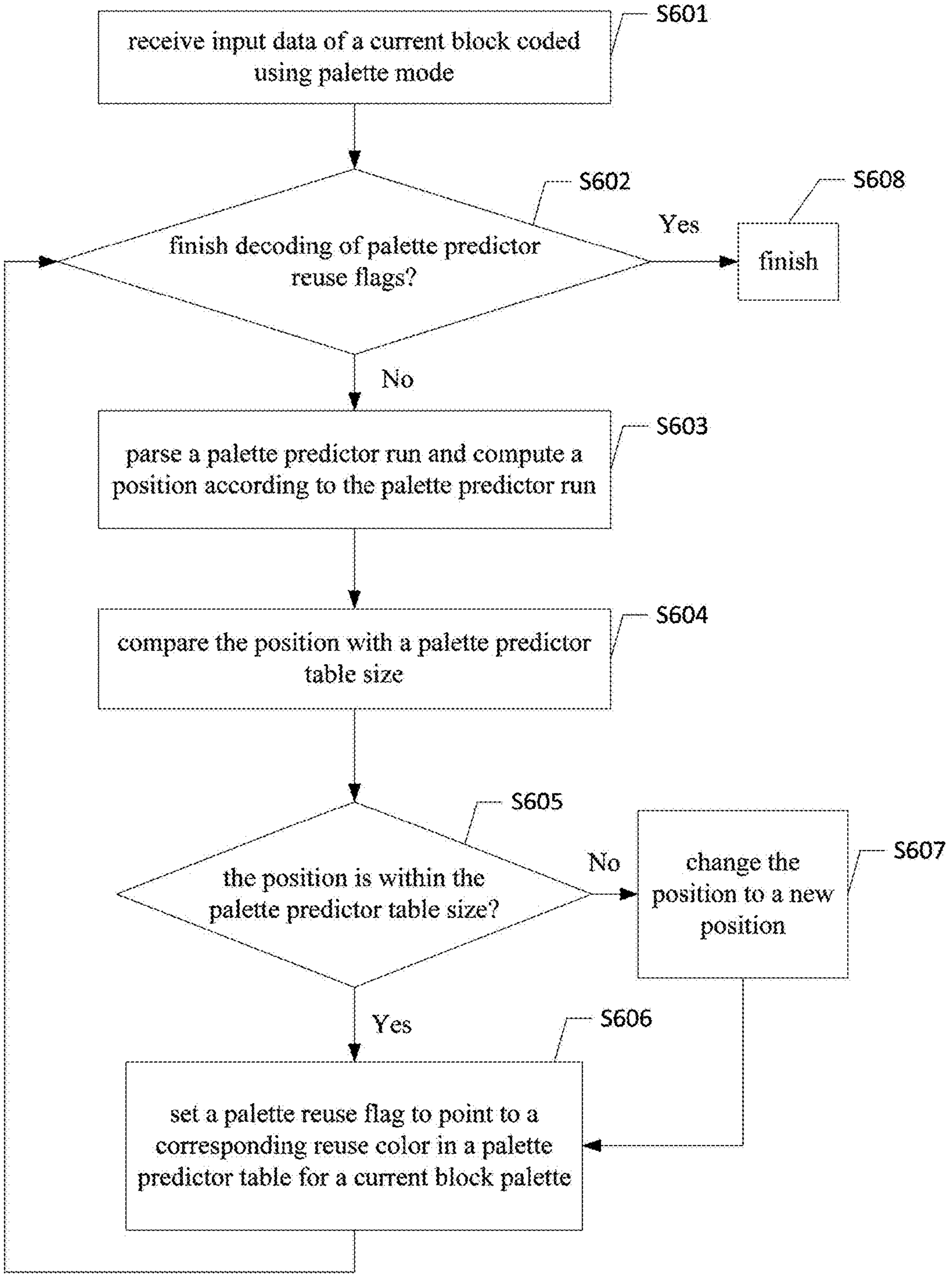
FIG. 6 is a flow chart illustrating an exemplary decoding process of palette predictor reuse flags.

FIG. 6 shows a flow chart of an exemplary decoding process for palette predictor reuse flags. Input data of a current block coded using palette mode is first received in step S601. Step S602 checks several conditions to determine if the decoding process of palette predictor reuse flags is finished, and if the decoding process is finish, the flow chart terminates in step S608. If the decoding process is not yet finished, step S603 parses a palette predictor run and computes a position in a palette predictor table according to the palette predictor run. The position is then compared with a palette predictor table size in step S604. Step S605 checks whether the position is within the palette predictor table size, and if the position is beyond the palette predictor table size, step S607 changes the position to a new position. In step S606, a palette reuse flag is set to 1 according to the position to point to a corresponding reuse color in the palette predictor table, and the corresponding reuse color is included in a current block palette.

Figure 7:
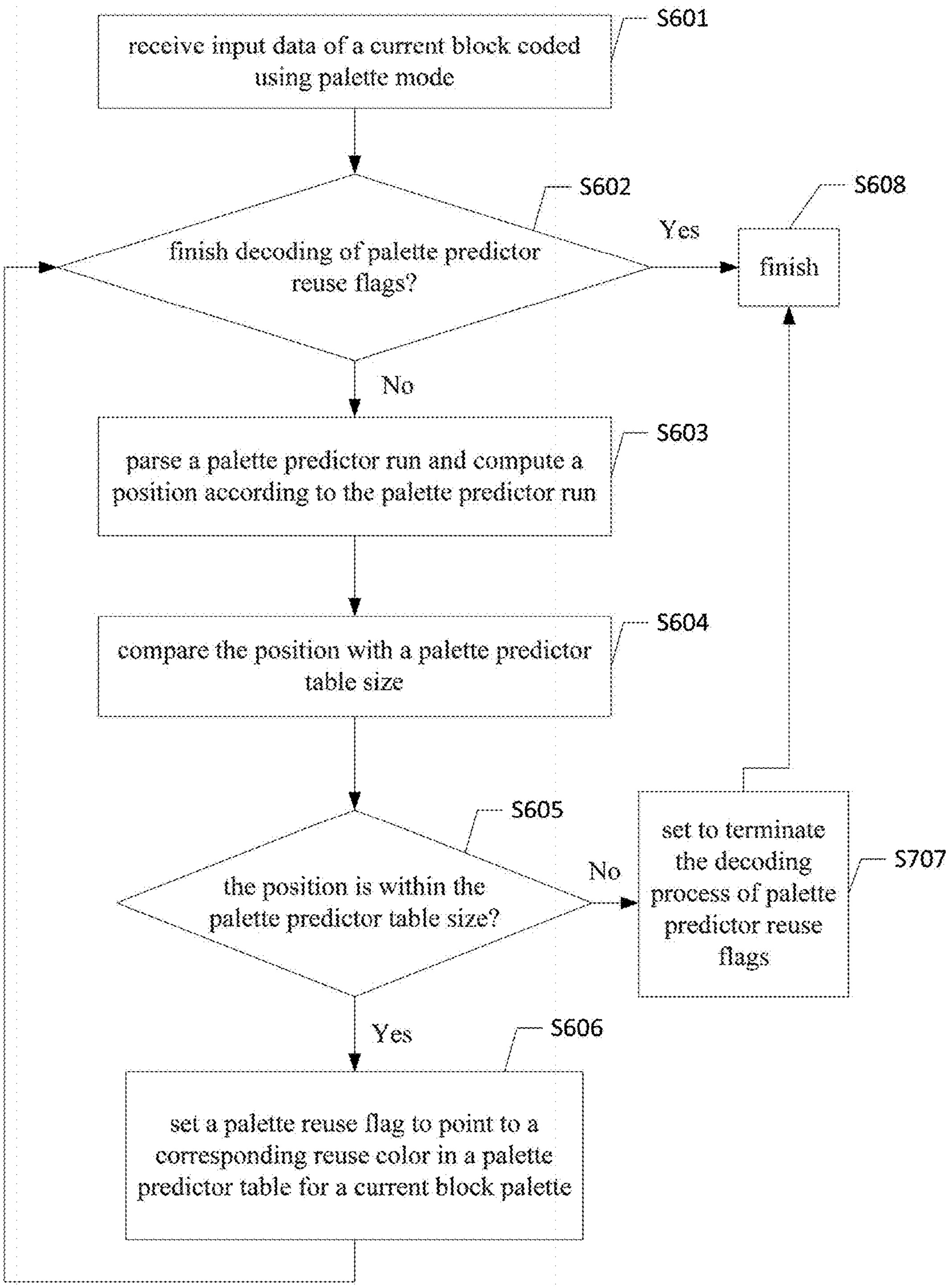
FIG. 7 is a flow chart illustrating another exemplary decoding process of palette predictor reuse flags.

FIG. 7 shows a flow chart of another exemplary decoding process for palette predictor reuse flags. Most of the steps in FIG. 7 are the same as the steps in FIG. 6 except for step S707. When the decoder determines the position computed by the palette predictor run is not within the palette predictor table size, step S707 immediately terminates the decoding process of palette predictor reuse flags to prevent possible decoding crash.

In HEVC SCC test model SCM-3.0 and Draft Text 2, the palette index map for indicating the palette indices corresponding to each pixel in the block is scanned utilizing traverse scanning order. Two types of traverse scanning order, vertical traverse scan and horizontal traverse scan, are introduced. The selection of the traverse scanning order is signaled by a syntax element palette_transpose_flag. FIG. 8A illustrates the horizontal traverse scan used for scanning the palette index map in SCM-3.0 and FIG. 8B illustrates the vertical traverse scan used for scanning the palette index map in SCM-3.0.

Fifth Embodiment

Figure 10A:
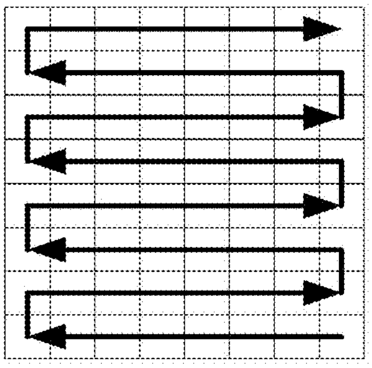
FIGS. 10A and 10B illustrate horizontal traverse scan with the 180-degree rotation and vertical traverse scan with the 180-degree rotation according to the fifth embodiment of the present invention.
Figure 10B:
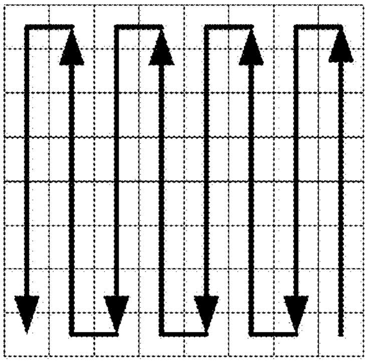

In the fifth embodiment, the vertical traverse scan and horizontal traverse scan for scanning the palette index map are allowed to be rotated by 180 degrees. FIG. 9A shows numbers in a 4×4 block indicating an original scanning order before rotation according to an exemplary horizontal raster scanning order, and FIG. 9B shows numbers in a 4×4 block indicating a scanning order after 180-degree rotation of the scanning order shown in FIG. 9A. A rotation of 180 degrees is actually equivalent to reversing the original scanning order where the first becomes the last and the last becomes the first. When a palette index map has a long run at the beginning of the block, the long run will become the last run after the 180-degree rotation, and the long last run can be encoded in a more efficiently way by using the last run flag (the Run-to-the-end signaling method) or a number of palette indices and a last palette run type flag (the not-signaling-the-last-run method). After applying the 180-degree rotation, the traverse scans in SCM-3.0 become rotated traverse scans as shown in FIGS. 10A and 10B. FIG. 10A illustrates the horizontal traverse scan with 180-degree rotation and FIG. 10B illustrates the vertical traverse scan with 180-degree rotation. The use of the 180-degree rotation is signaled by a rotation flag index_rotation_flag. In one example, this rotation flag index_rotation_flag is signaled independent of a transpose flag palette_transpose_flag, so both horizontal and vertical traverse scans can enable or disable the 180-degree rotation according to the rotation flag. There are four types of traverse scans available in this example: Horizontal_Traverse, Vertical_Traverse, Rotated_horizontal_Traverse, and Rotated_Vertical¯Traverse. In another example, the signaling of the rotation flag index_rotation_flag is conditioned under the signaling of the transpose flag palette_transpose_flag, where only horizontal traverse scan or only vertical traverse scan is allowed to be rotated. The total number of traverse scan types in this example becomes three: Horizontal_Traverse, Vertical_Traverse, and Rotated_horizontal_Traverse, or Horizontal_Traverse, Vertical_Traverse, and Rotated_Vertical_Traverse. The rotation flag can be context coded or bypass coded.

Sixth Embodiment

Figure 11A:
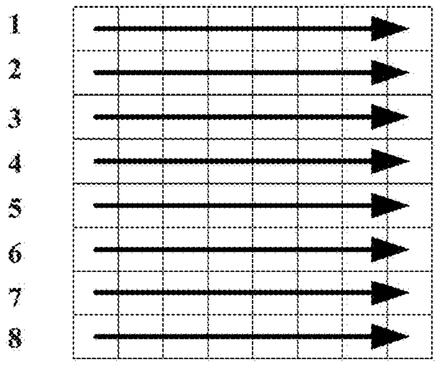
FIGS. 11A and 11B illustrate conventional horizontal raster scan and conventional vertical raster scan respectively.
Figure 11B:
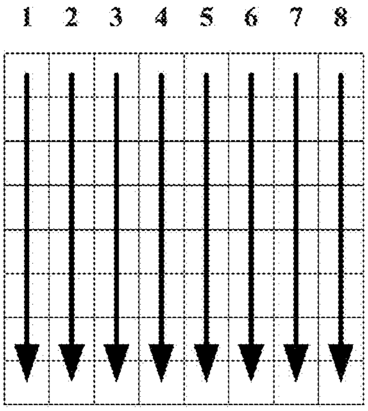
Figure 12A:
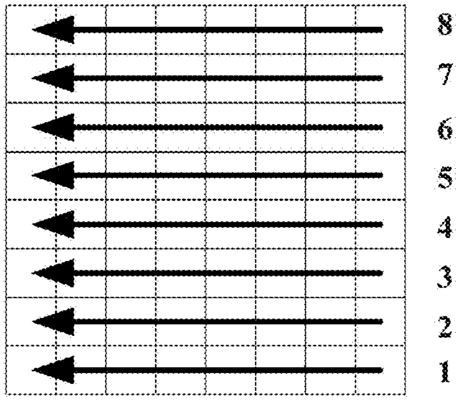
FIGS. 12A and 12B illustrate horizontal raster scan with 180-degree rotation and vertical rater scan with 180-degree rotation according to the sixth embodiment of the present invention.
Figure 12B:
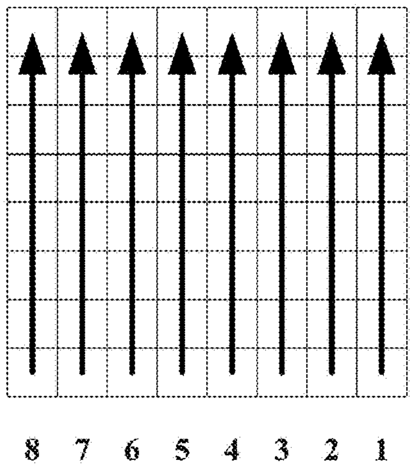

The sixth embodiment uses line-by-line raster scans with 180-degree rotation to scan the palette index map. FIG. 11A depicts the conventional horizontal raster scanning order and FIG. 11B depicts the conventional vertical raster scanning order for scanning coefficients. By applying 180-degree rotation to the conventional horizontal raster scanning order, the rotated horizontal scan begins at the bottom right corner as depicted in FIG. 12A. Similarly, the rotated vertical scan begins at the bottom right corner as depicted in FIG. 12B. When a palette index map with a long run at the beginning of the block is scanned by the 180-degree rotated raster scanning order, the long run becomes the last run after 180-degree rotation, where Run-to-the-end signaling or not-signaling-the-last-run signaling methods can efficiently code such run. A rotation flag index_rotation_flag used to signal the 180-degree rotation is either signaled in pair with a transpose flag palette_transpose_flag or conditionally signaled under the signaling of the scanning orientation. Signaling of the rotation flag and transpose flag in pair allows both horizontal and vertical raster scans rotate by 180 degrees. There are four types of raster scans available in this case: Horizontal_Raster, Vertical_Raster, Rotated_Horizontal_Raster, and Rotated_Vertical_Raster. Conditionally signaling of the rotation flag under the signaling of the scanning orientation only allows a predetermined scanning orientation to be rotated by 180 degrees. For example, if the rotation flag is conditionally signaled under the signaling of the transpose flag, only one of the horizontal raster scan or vertical raster scan can be rotated by 180 degrees according to the transpose flag. The number of raster scan types becomes three in this case: Horizontal_Raster, Vertical_Raster, and Rotated_Horizontal_Raster, or Horizontal_ Raster, Vertical_Raster, and Rotated_Vertical_Raster. The rotation flag can be context coded or bypass coded.

Seventh Embodiment

The seventh embodiment combines the traverse scanning order in the fifth embodiment and the raster scanning order in the sixth embodiment. In an example of independently signaling the rotation flag index_rotation_flag and the transpose flag palette_transpose_flag, by inserting an additional traverse flag palette_traverse_flag to indicate whether traverse scan or raster scan is used, the number of scan types available is up to eight. In another example, when the rotation flag is conditionally signaled under the transpose flag, six scan types are available with the traverse flag. If the 180-degree rotation is only allowed in the horizontal orientation, the six scan types are Horizontal_Traverse, Vertical_Traverse, Rotated_Horizontal_Traverse, Horizontal_Raster, Vertical_Raster, and Rotated_Horizontal_Raster. If the 180-degree rotation is only allowed in the vertical orientation, the six scan types becomes Horizontal_Traverse, Vertical_Traverse, Rotated_Vertical_Traverse, Horizontal_Raster, Vertical_Raster, and Rotated_Vertical_Raster.

Eight Embodiment

In the eighth embodiment, only the transpose flag is signaled to indicate the scanning orientation, the rotation flag is not signaled as the scanning order is always rotated by 180 degrees. When palette indices are grouped and signaled in the front of the palette index map syntax signaling, one method to implement without an additional temporary buffer (in addition to the buffer for palette index map) is to place the palette index data into the end of the palette index map buffer, and reconstruct the palette indices with runs sequentially at the front of the palette index map buffer. If the palette indices are already rotated, the implementation places the palette index data in the front, and reconstructs the palette indices with runs from the end. In the eighth embodiment, the rotation flag is not signaled since the 180-degree rotation is always applied. The transpose flag palette_transpose_flag is still used to determine the scanning orientation between, Rotated_Horizontal_Traverse and Rotated_Vertical_Traverse, or between Rotated_Horizontal_Raster and Rotated_Vertical_Raster scanning orders. It is also possible to combine the four rotated scanning orders with an additional traverse flag palette_traverse_flag. Some other alternations include: always rotate the raster scanning orders, always rotate the traverse scanning orders, always rotate the horizontal scanning orders, always rotate the vertical scanning orders, always rotate the horizontal raster scanning order, always rotate the vertical raster scanning order, always rotate the horizontal traverse scanning order, and always rotate the vertical traverse scanning order.

Ninth Embodiment

As shown in FIGS. 10A and 10B and FIGS. 12A and 12B, the scanning order of traverse scans with the 180-degree rotation and raster scans with the 180-degree rotation always starts from the end of the block (bottom right corner) to the beginning of the block (upper left corner). The ninth embodiment skips the last palette run type flag last run type flag for palette index map coding. The last palette run type flag indicates the palette run type of the last run to be the COPY_ABOVE mode or the COPY_INDEX mode. This flag can be skipped when the scanning order is 180-degree rotated because the geometrically first run type is always the COPY_INDEX mode.

Tenth Embodiment

The 180-degree rotation described in the previous embodiments introduces additional scanning patterns to palette index map coding. The tenth embodiment applies rotation to the scanning order in palette index map coding according to block-size constraints. Rotation is only used when a block size is within a rotation size limit. For example, rotated scanning order is allowed for scanning 8×8, 16×16, and 32×32 blocks when the rotation size limit is set to 32. If the rotation size limit is set to 16 or 8, rotation is only allowed for 8×8 and 16×16 scans or 8×8 scan respectively. With the block-size constraints, the rotation flag index_rotation_flag is not encoded nor parsed for block sizes larger than the rotation size limit. In other words, the rotation flag is only present when the block width is less than or equal to the rotation size limit. The block-size constraints can be used with any of the aforementioned embodiments with rotated scanning orders. For example, the block-size constraints for palette index map rotation are only applied to the horizontal raster scanning order, vertical raster scanning order, horizontal traverse scanning order, vertical traverse scanning order, or any combinations thereof. FIG. 13 illustrates a table showing the available raster scanning patterns for block sizes 8×8, 16×16, and 32×32 if the rotation size limit is 8 and rotation is applied to both the horizontal and vertical raster scans. Rotated_Horizontal_Raster and Rotated_Vertical_Raster scanning orders are only applied to 8×8 blocks. FIG. 14 illustrates a table showing the raster scanning patterns for block size 8×8, 16×16, and 32×32 if the rotation size limit is 8 and rotation is only applied to the horizontal raster scan.

The conditional signaling described in the fifth, sixth, seventh, and tenth embodiments can also be applied to other type of alternative backward scans, for example, row-flipped horizontal scans and column flipped vertical scans.

Although the first embodiment to the tenth embodiment of the palette coding methods are described, the invention is not limited to these embodiments. In each embodiment, the choice of the video coding method with palette coding is an example to illustrate various embodiments and should not be understood as a restriction or a requirement for any embodiment of the invention. The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of decoding image or video data in a decoding system, comprising:

receiving input data associated with a current block coded using palette mode;

parsing a palette predictor run and computing a position of reused colors in a palette predictor table according to the palette predictor run;

determining a size of the palette predictor table;

comparing the position computed according to the palette predictor run with the size of the palette predictor table to obtain a comparison result; and applying palette decoding to the current block according to the comparison result.

2. The method of claim 1, wherein the position is computed by decoding the palette predictor run and adding the decoded palette predictor run to a previous position.

3. The method of claim 1, further comprising if the comparison result indicates the position computed according to the palette predictor run is within the palette predictor table, setting a palette reuse flag corresponding to the position computed according to the palette predictor run to indicate a reused color in the palette predictor table is selected for a palette of the current block.

4. The method of claim 1, further comprising if the comparison result indicates the position computed according to the palette predictor run is not within the palette predictor table, changing the position to a new position or terminating a decoding process of palette predictor reuse flags.

5. The method of claim 4, wherein terminating the decoding process of the palette predictor reuses flags comprises stop parsing another palette predictor run and stop adding other reused colors from the palette predictor table to a palette of the current block.

6. The method of claim 4, wherein changing the position to the new position comprises setting a palette reuse flag corresponding to a last position in the palette predictor table to indicate a reused color in the last entry of the palette predictor table is selected for a palette of the current block.

7. The method of claim 4, wherein changing the position to the new position comprises setting a palette reuse flag corresponding to an immediate next position in the palette predictor table to indicate a reused color immediate next to a previous selected reused color in the palette predictor table is selected for a palette of the current block.

8. The method of claim 4, wherein changing the position to the new position comprises setting a palette reuse flag corresponding to a predefined position in the palette predictor table to indicate a reused color in a corresponding entry of the palette predictor table is selected for a palette of the current block.

9. An apparatus of decoding image or video data in a decoding system, the apparatus comprising one or more electronic circuits configured to:

receive input data associated with a current block coded using palette mode;

parse a palette predictor run and compute a position of reused colors in a palette predictor table according to the palette predictor run;

determine a size of the palette predictor table;

compare the position computed according to the palette predictor run with the size of the palette predictor table to obtain a comparison result; and apply palette decoding to the current block according to the comparison result.

10. The apparatus of claim 9, wherein the position is computed by decoding the palette predictor run and adding the decoded palette predictor run to a previous position.

11. The apparatus of claim 9, further comprising if the comparison result indicates the position computed according to the palette predictor run is within the palette predictor table, setting a palette reuse flag corresponding to the position computed according to the palette predictor run to indicate a reused color in the palette predictor table is selected for a palette of the current block.

12. The apparatus of claim 9, further comprising if the comparison result indicates the position computed according to the palette predictor run is not within the palette predictor table, changing the position to a new position or terminating a decoding process of palette predictor reuse flags.

13. The apparatus of claim 12, wherein terminating the decoding process of the palette predictor reuse flags comprises stop parsing another palette predictor run and stop adding other reused colors from the palette predictor table to a palette of the current block.

14. The apparatus of claim 12, wherein changing the position to the new position comprises setting a palette reuse flag corresponding to a last position in the palette predictor table to indicate a reused color in the last entry of the palette predictor table is selected for a palette of the current block.

15. The apparatus of claim 12, wherein changing the position to the new position comprises setting a palette reuse flag corresponding to an immediate next position in the palette predictor table to indicate a reused color immediate next to a previous selected reused color in the palette predictor table is selected for a palette of the current block.

16. The apparatus of claim 12, wherein changing the position to the new position comprises setting a palette reuse flag corresponding to a predefined position in the palette predictor table to indicate a reused color in a corresponding entry of the palette predictor table is selected for a palette of the current block.

* * * * *